UNITED STATES PATENT OFFICE.

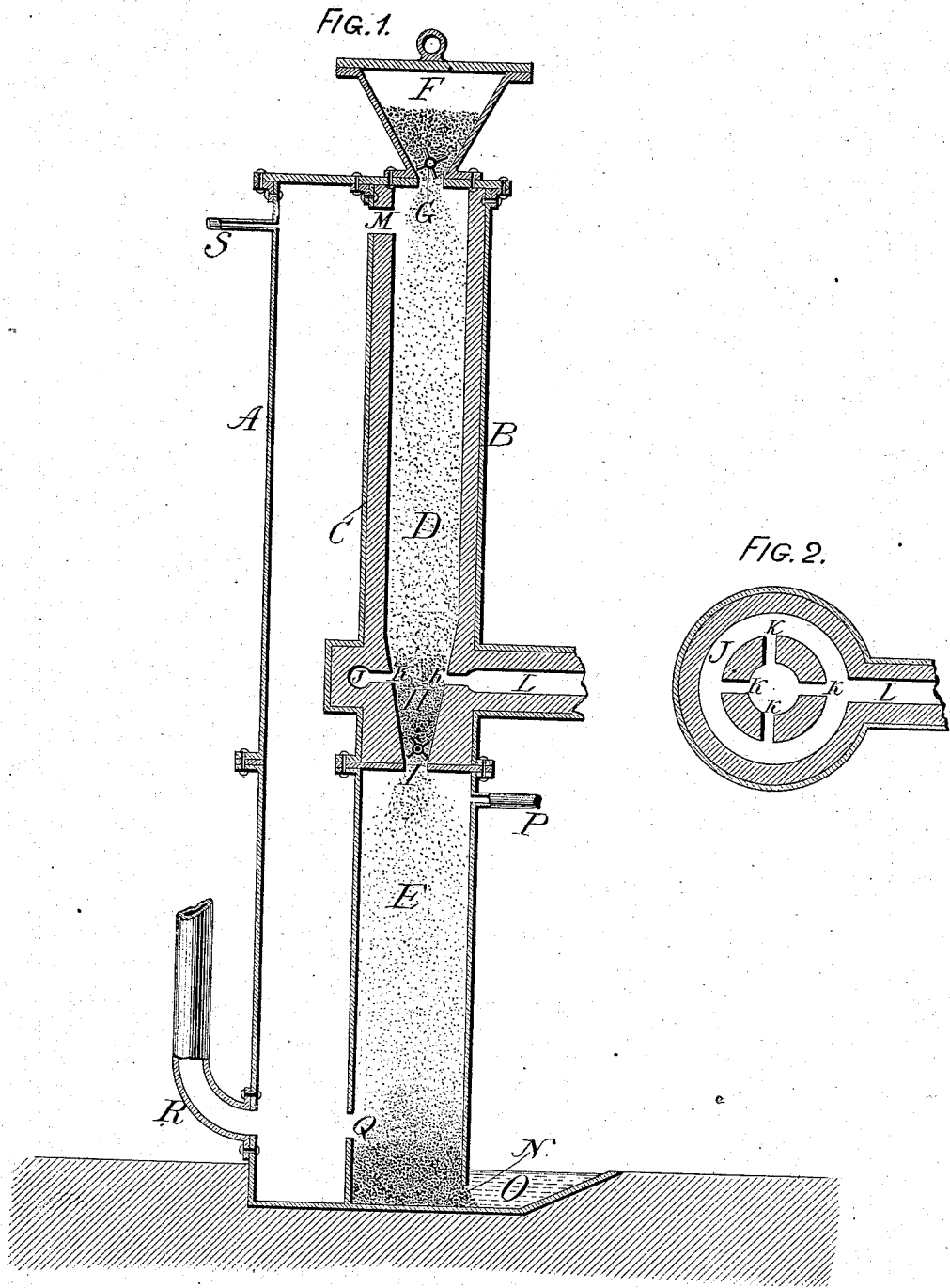

THOMAS B. FOGARTY, OF BROOKLYN, NEW YORK.

PROCESS OF AND APPARATUS FOR MANUFACTURING AMMONIA.

SPECIFICATION forming part of Letters Patent No. 288,324, dated November 13, 1883.

Application filed October 9, 1882. (No model.)

*To all whom it may concern:*

Be it known that I, THOMAS B. FOGARTY, of the city of Brooklyn, county of Kings, and State of New York, have invented a new and useful Process of and Apparatus for Manufacturing Ammonia; and I hereby declare the following to be a full, clear, and exact specification of the same, reference being had to the accompanying drawings, forming part of this specification.

The object of my invention is to produce ammonia in a simple and economical manner through the combination of the nitrogen of the air with pure hydrogen gas.

It is well understood that ammonia cannot be practically and economically produced upon a large scale by the direct synthesis of its elements; but it is at the same time well known that there is no practical difficulty in the way of the artificial production of cyanogen, and that this having been produced as an intermediate step, its conversion into ammonia is an easy matter.

It is well known that it is extremely difficult to effect the direct combination of nitrogen and carbon—the elements of cyanogen—even at a high temperature. If, however, an alkali or an alkaline earth, or indeed any substance capable of combining with cyanogen, or capable of yielding any substance having an affinity for cyanogen, be present, combination is easily effected, the cyanogen produced combining with the alkali and forming a cyanide or cyanate thereof. Taking advantage, therefore, of this disposition of the incandescent nitrogen and carbon to combine in the presence of an alkali or alkaline earth, I submit carbon and alkali, suitably mixed and raised to incandescence, to the action of incandescent nitrogen in a close furnace or cupola, producing cyanides and cyanates of the alkali used, and afterward decomposing the cyanides and cyanates so formed by steam, producing ammonia and oxides of carbon, and causing the alkali to return to its original state, or to enter into fresh combinations. It is also known that cyanogen is very combustible, and is readily consumed in the presence of oxygen, or of substances containing oxygen and capable of yielding it to the cyanogen, and consequently the inference is obvious that the gaseous products of combustion which have been caused to pass through a thick layer or mass of incandescent carbon contained in an ordinary furnace, so as to be entirely freed from oxygen, especially if freed from moisture, consisting, as they do, of hydrogen, carbonic oxide, carbonic acid, and free nitrogen, are an excellent source of nitrogen for the production of ammonia.

I shall now proceed to describe my invention so fully and clearly that any person skilled in the art of making ammonia may be able to understand and practice the same.

By means of a suitably-constructed superheater, or of any other suitable apparatus, I raise to a high or incandescent temperature the gaseous products of combustion, as far as possible free from oxygen, or the gaseous products of the action of steam and air upon incandescent carbon, known as "generator-gases," and in this incandescent state I cause them to pass through a suitably-constructed cupola or furnace, wherein they meet and are brought into intimate contact and admixture with a moving mass or falling shower of alkalized carbon, or mixed carbon and alkali, in a pulverized or highly comminuted state. Under the influence of the high temperature, the alkalized carbon falling or passing through the cupola or furnace now combines with the nitrogen of the gas to form alkaline cyanides and cyanates, and these, being introduced into a chamber or chambers separate from that in which they were produced, and being there brought into contact with steam at a reduced temperature, quickly decompose it, producing ammonia and free hydrogen gas, the carbon contained in the cyanides being converted into carbonic oxide and carbonic acid, and their alkali returning to its original state or entering into fresh combinations. The ammonia thus formed is absorbed by carbonic acid in a suitable scrubber or other suitable apparatus, and may be converted into sulphate or other suitable salts of ammonia by any of the ordinary methods in use.

The annexed drawings illustrate and are a part of this specification.

In the drawings, Figure 1 represents a vertical section of a vertical or upright cupola or furnace, divided vertically into the chambers A and B by the partition C. Fig. 2 represents a horizontal section of the same.

The chamber B is shown as divided horizontally into an upper chamber, D, and a lower chamber, E. It is provided at top with a suitable hopper, F, furnished with a feeding-wheel, G, and at bottom has a chute or funnel, H, suitably provided with an extractor, I, by means of which and of the feeder G the pulverized alkalized carbon may be fed into and extracted from the chamber D at any desired rate of speed. The upper chamber, D, is also suitably provided with an annular chamber, J, communicating with the chute H by the tuyeres K K, and provided with a suitable inlet-pipe, L, for the introduction of incandescent nitrogenous gas. The chamber D is also suitably provided with a suitable eduction-port, M, for escaping gases, and is suitably protected by fire-brick or other refractory material. The lower chamber, E, is provided at bottom with a suitable opening, N, for removing the ashes and cinders, suitably sealed in a pan of water, O. The chamber E is also provided with the steam-pipe P, and communicates with the chamber A by means of the opening Q at the bottom of the partition C. The chamber A communicates at top with the chamber D by means of the port M, and at bottom with the chamber E by means of the opening Q. It is provided with an outlet, R, for the escape of uncombined gases, and with a suitably-connected steam-pipe, S.

The mode of operation is as follows: I mix coal, coke, charcoal, peat, or any other suitable carbonaceous fuel, in suitable proportions, with any suitable alkali or alkaline earth. From economical considerations I prefer to use lime mixed in suitable proportions with common salt, or, what is much better, slaked with a strong solution of common salt, (chloride of sodium,) and having reduced the mixture to a pulverized or finely-divided state, (which may be done either before or after the mixing, as may be most convenient, and may be effected by grinding or by any other suitable means,) I place such pulverized or finely-divided alkalized fuel in the hopper F, whence, by means of the feeding-wheel G or by means of any other suitable or equivalent device, I feed it continuously and at any desired rate of speed into the chamber D, and at the same time I admit to D through the tuyeres K K a suitably-regulated stream, current, or volume of nitrogenous gas, previously raised to a high or incandescent temperature by being passed or forced through a suitable superheater or other suitable apparatus. This volume of incandescent gas, finding the passage through the chute H stopped by a mass of cyanidized carbon, resting upon and sustained by the extractor I, as shown in the drawings, ascends through the chamber D, and, meeting the falling mass of pulverized alkalized fuel, and being thus brought into intimate contact and admixture with the entire mass, instantaneously raises it to a high or incandescent temperature, the nitrogen of the gas combining with the carbon and alkali of the alkalized fuel to form cyanogen or alkaline cyanides and cyanates, and the gaseous products escaping through the outlet M into the chamber A, where they meet with a suitably-adjusted volume of steam admitted through the pipe S, whereupon the gaseous cyanogen present is decomposed by the steam in the chamber, and the volume of mixed gases escapes through the outlet R to a suitable scrubber or other suitable apparatus. (Not shown in the drawings.) Meanwhile the solid cyanides and cyanates produced in D fall into the chute H, whence they are caused to pass, at any desired rate of speed, into the lower chamber, E, in falling through which they meet with a volume of steam admitted through the pipe P, and are decomposed by it, the nitrogen which they contain being converted into ammonia, their carbon being changed into carbonic oxide and carbonic acid, and their alkali returning to its original state or entering into fresh combinations. The volume of steam admitted through P must be regulated more with a view of maintaining the temperature of the chamber E at a point suitable to the decomposition of the alkaline cyanides and cyanates, and to the formation and subsequent preservation of ammonia, than with that of supplying a mere equivalent of steam to the alkaline cyanides and cyanates. The mixture of carbon, clinker, and ashes, which falls to the bottom of the chamber E, is received in a suitable pan or reservoir of water, O, and may be removed through an opening, N, suitably sealed in the water in the pan O. The ammoniacal and other gases produced in the chamber E escape into the chamber A through the opening Q and join the volume of mixed gases escaping through the outlet R. If the mass of carbon, clinker, and ashes taken from the water-pan O is found, upon examination, to contain undecomposed cyanides and cyanates, it may be lixiviated with a solution containing a salt of iron, with the production of a ferro-cyanide of the alkali used. It usually happens that at the end of the process there will be a large volume of heating-gas left over from the operation, and it is scarcely necessary to add that this may be turned to account by being used or sold for heating purposes, or by being carbureted and used or sold as illuminating-gas.

I do not bind or confine myself to the process and form of apparatus described exactly as described, for it is evident that they may be varied considerably.

What I claim, and desire to secure by Letters Patent, is—

1. The process of manufacturing ammonia, which consists in treating a falling shower of pulverized or finely-divided alkalized carbon with a current of highly-heated nitrogenous or furnace gases to form cyanogen and cyanogen salts, then transferring these compounds to separate chambers, in which they are decomposed by steam with the simultaneous formation of ammonia, substantially as described.

2. In an apparatus for the production of ammonia, the combination of the chambers A, D, and E, constructed and operated substantially as described.

In testimony whereof I have signed my name to this specification before two subscribing witnesses.

THOS. B. FOGARTY.

Witnesses:
 EDWIN F. COREY,
 CHARLES COPPINGER.